ELIE COHEN
SZYMON ROTH
INVENTOR

Karl G. Ross
AGENT

United States Patent Office 3,281,615
Patented Oct. 25, 1966

3,281,615
ELECTROMAGNETIC EDDY-CURRENT COUPLING OR BRAKING DEVICES
Elie Cohen, 89 bis rue Bobillot, and Szymon Roth, 18 Boulevard Barbes, both of Paris, France
Filed June 26, 1963, Ser. No. 290,857
Claims priority, application France, June 28, 1962, 902,320, Patent 1,335,545
10 Claims. (Cl. 310—93)

This invention relates to electromagnetic eddy-current coupling or braking devices. Such devices commonly comprise a coaxial arrangement of an inner and an outer rotor, and a stator surrounding these rotors and including exciter coils; the inner rotor being coupled to one shaft and the outer rotor being coupled to another shaft. When one of the shafts in this device, for example the shaft coupled to the outer rotor, is caused to rotate, the other shaft is driven together with the inner rotor at a speed below that of the said one shaft. This transmission of motion from one shaft to another is accompanied by a loss of energy, which is converted into heat and requires dissipation.

In existing devices of this type, this heat is frequently dissipated by a fan provided at one end of the device, on the faster-rotating shaft. However, this method has one serious drawback. Since the fan is at one end of the device, the air drawn-in by this fan is heated as it passes along inside the device so that at the end at which it is discharged this air is at a high temperature. It is thus clear that the ball or roller bearings at this latter end, i.e. remote from the fan, are very poorly cooled. This disadvantage imposes a limitation on the power which can be transmitted by the device.

It is one object of the present invention to provide an eddy-current coupling or braking device which is cooled more efficiently than the existing devices referred to above.

It is thus a feature of this invention to provide an eddy-current coupling or braking device in which a plurality of flow paths are provided for the flow of cooling air through the device, the length of these paths being kept small in order to ensure that those parts of the device lying in or adjacent said paths are adequately and efficiently cooled.

The invention further provides an eddy-current coupling and braking device in which cooling air is drawn into the device from the two ends thereof and discharged at a position intermediate said ends.

The coupling can thus include an air fan at a position intermediate the ends of the device while the inner and outer rotors and the stator are designed so that cooling air flows through the device between said intermediate position and the said ends of the device.

In one particular embodiment of the device, air is drawn-in axially and symmetrically at both ends of the device and discharged radially at a central part thereof. For this purpose, the inner and outer rotors have axially-extending air passages, and radially extending air passages substantially half-way along their length, the stator having an annular passage located opposite the said radial passages. A fan comprising a number of ring-shaped radial blades rigidly secured to the periphery of the outer rotor, rotates within this annular passage. As a result of this arrangement, the bearings supporting the two shafts are subjected directly to the streams of cool air and are thus efficiently cooled.

In one preferred form, the inner rotor comprises two cylindrical members mounted on the same shaft, each member consisting of an inner bushing rigidly fixed to the said shaft and of a cylindrical sleeve, the bushing and sleeve in each member being joined together by a number of radial fins. Between these two members a radial partition is fitted to act as a deflector and to direct the streams of air drawn in from both ends of the device towards the fan.

The outer rotor is made in the form of a drum, the end plates of which have large openings to admit the air, and the periphery of which has a number of windows intermediate the said ends and so positioned as to be in alignment with the gap between the two members of the inner rotor.

In order that the invention can be fully understood one embodiment thereof will now be described, by way of example, with reference to the accompanying drawings, in which.

Figure 1:
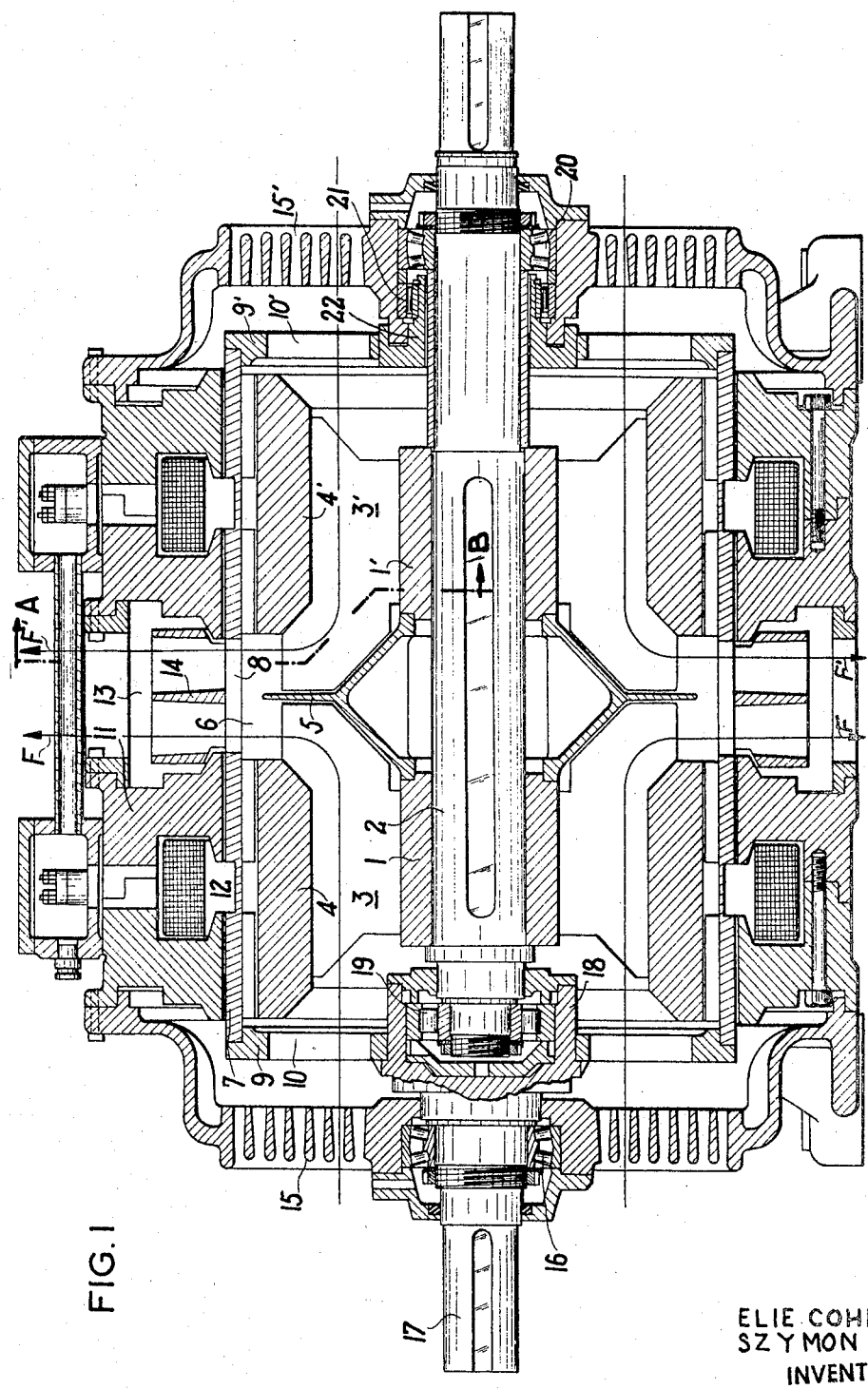
FIGURE 1 is a longitudinal section of an eddy-current coupling or braking device according to the invention.
Figure 2:
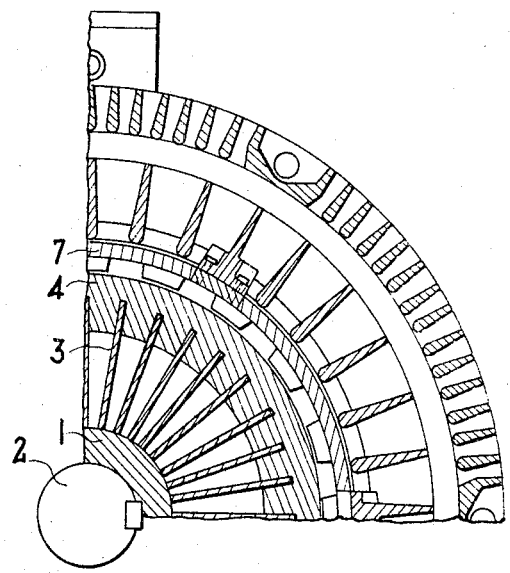
FIGURE 2 is a cross-section along the dot-dash line A–B in FIGURE 1.
Figure 3:
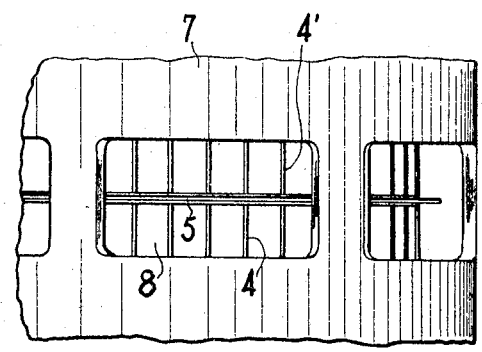
FIGURE 3 is a plan view of the outer rotor, from which the fan blades have been removed.

Referring now to the drawings, an inner rotor comprises two bushings 1 and 1' keyed to a common shaft 2 and joined respectively by a plurality of fins 3 and 3' to two annular rims 4 and 4'. The bushing and rims are constructed from a magnetic metal. The two bushings 1 and 1' are connected together by a Y-shaped radial deflector partition 5, which lies between, and is spaced from, the fins 3 and 3'. The gap between the two rims 4 and 4' constitutes an annular passage 6 through which air can pass.

An outer rotor surrounds the inner rotor and comprises a cylindrical portion 7 having a plurality of windows 8 aligned with the passage 6, and two end plates 9 and 9' in which are wide openings 10 and 10'.

A stator surrounds this outer rotor and comprises a frame 11 which houses exciting coils 12 and a central annular groove 13 open to both the interior and exterior of the device. Within this groove rotate blades 14, rigidly fixed to the cylindrical portion 7 of the outer rotor, these blades constituting a fan.

On each side of frame 11 of the stator are perforated end plates 15 and 15'. Plate 15 carries a bearing 16 for the shaft 17 of the inner rotor. This shaft carries a cup 18, inside the inner rotor, on the outer surface of which is mounted the end plate 9 and on the inner surface of which is mounted a bearing 19 for the shaft 2.

At the other end, plate 15' carries a bearing 20 for the shaft 2, and a bearing 21 for a hollow stub shaft 22, which in turn carries the end plate 9' of the outer rotor.

When the device is running, the blades of fan 14 rotate and draw-in air from both ends of the device, through the perforations in the stator end plates 15 and 15'. Most of this air passes through the openings 10 and 10' in the end plates 9 and 9' of the outer rotor and enters the gaps between fins 3 and 3' of the inner rotor. The issuing streams of air then strike the radial deflector partition 5, which deflects them through passages 6 and windows 8 to the fan blades 14 whence they are driven outwardly from the device by way of stator groove 13. Arrows F and F' indicate the paths of these air streams.

Another part of the air which has passed through the perforations in stator plates 15 and 15' and openings 10 and 10' passes through the small gap between the inner and outer rotors and reaches the fan intake passages 6, and likewise another part of the air that has passed through the perforations in stator plates 15 and 15' passes through the gap between the stator and the outer rotor to the fan intake passage 6.

These various streams of air are thus very effective in cooling the device as a whole, that is to say, the various bearings, the masses of both the inner and outer rotors and the stator together with the exciting coils housed in the latter.

Although there has been described and shown what is considered to be preferred embodiment of the invention, it will be apparent that many changes may be made without departing from the essential spirit of the invention. It is intended, therefore, in the annexed claims to cover all such changes and modifications as fall within the scope of the invention.

We claim:
1. An eddy-current coupling or braking device, comprising:
   an inner rotor coupled to a first shaft,
   an outer rotor coupled to a second shaft, said outer rotor surrounding, and being spaced from, said inner rotor and coaxial therewith for defining respective axially inwardly extending cooling passages for dissipation of heat from said coaxial rotors,
   a stator surrounding, and spaced from, said outer rotor and coaxial with said inner and outer rotors, and
   fan means intermediate the ends of said rotors operable for causing cooling air to flow through said device, said stator, inner rotor and outer rotor together defining L-shaped flow paths for said cooling air extending axially from the two ends of the device and radially at a location intermediate said ends.

2. A device according to claim 1, wherein said stator and said inner and outer rotors are cylindrical members the end portions of each of which define a plurality of axially-extending openings and the circumferential portions of which define radially-extending openings, said openings together constituting at least part of said air flow paths, and wherein said fan means are disposed in said radially-extending openings.

3. An eddy-current coupling or braking device, comprising:
   an inner rotor coupled to a first shaft,
   an outer rotor coupled to a second shaft, said outer rotor surrounding, and being spaced from said inner rotor and lying coaxially therewith,
   a stator surrounding, and spaced from said outer rotor and lying coaxially with said inner and outer rotors, and
   fan means for causing cooling air to flow through said device, said stator, inner rotor and outer rotor together defining L-shaped flow paths for said cooling air extending axially from the two ends of the device and radially at a position intermediate said ends, said stator and said inner and outer rotors being cylindrical members the end portions of each of which define a plurality of axially-extending openings and the circumferential portions of which define radially-extending openings, said openings together constituting at least part of said air flow paths, said fan means being disposed in said radially extending openings, said radially-extending opening in said stator extending around the whole circumference thereof, said fan means comprising a plurality of blades secured to said outer rotor and extending into said radially-extending opening of said station.

4. An eddy-current coupling or braking device, comprising:
   an inner rotor coupled to a first shaft,
   an outer rotor coupled to a second shaft, said outer rotor surrounding, and being spaced from said inner rotor and lying coaxially therewith,
   a stator surrounding, and spaced from said outer rotor and lying coaxially with said inner and outer rotors, and
   fan means for causing cooling air to flow through said device, said stator, inner rotor and outer rotor together defining L-shaped flow paths for said cooling air extending axially from the two ends of the device and radially at a position intermediate said ends, said stator and said inner and outer rotors being cylindrical members the end portions of each of which define a plurality of axially-extending openings and the circumferential portions of which define radially-extending openings, said openings together constituting at least part of said air flow paths, said fan means being disposed in said radially-extending openings, said radially extending opening in said stator extending around the whole circumference thereof, said fan means comprising a plurality of blades secured to said outer rotor and extending into said radially-extending opening of said stator, said blades being arranged in a ring and extending outwardly from the outer periphery of said outer rotor.

5. An eddy-current coupling or braking device, comprising:
   an inner rotor coupled to a first shaft,
   an outer rotor coupled to a second shaft, said outer rotor surrounding, and being spaced from said inner rotor and lying coaxially therewith;
   a stator surrounding, and spaced from said outer rotor and lying coaxially with said inner and outer rotors, and
   fan means for causing cooling air to flow through said device, said stator, inner rotor and outer rotor together defining L-shaped flow paths for said cooling air extending axially from the two ends of the device and radially at a position intermediate said ends, said stator and said inner and outer rotors being cylindrical members the end portions of each of which define a plurality of axially-extending openings and the circumferential portions of which define radially-extending openings, said openings together constituting at least part of said air flow paths, said fan means being disposed in said radially-extending openings, said radially extending opening in said stator extending around the whole circumference thereof, said fan means comprising a plurality of blades secured to said outer rotor and extending into said radially-extending opening of said stator, said inner rotor comprising two cylindrical members mounted adjacent each other on said first shaft, each cylindrical member of the inner rotor comprising:
      a bushing secured to said first shaft,
      a cylindrical sleeve, and
      a plurality of fins secured between said sleeve and said bushing.

6. A device according to claim 5, comprising:
   a radially extending deflector vane intermediate the bushings of the two said cylindrical members and secured in common thereto, said deflector vane lying in alignment with said radially extending openings in the inner and outer rotors and said stator.

7. A device according to claim 6, wherein part of said cooling air flows axially between said inner and outer rotors and between said outer rotor and said stator.

8. An eddy-current coupling or braking device, comprising:
   a stator,
   two coaxial rotors surrounded by the stator and spaced from both each other and an inner wall of said stator for defining respective axially inwardly extending cooling passages for dissipation of heat from said coaxial rotors, an inner one of said rotors being coupled to a first shaft and an outer one of said rotors being coupled to a second shaft, and
   fan means intermediate the ends of said rotors operable for causing cooling air to flow into the device axially from the two ends thereof along said repective passages and to issue radially therefrom at a location intermediate said ends.

9. An eddy-current coupling or braking device comprising:
   a stator,
   two coaxial rotors surrounded by the stator and spaced from both each other and an inner wall of said stator, an inner one of said rotors being coupled to a first shaft and an outer one of said rotors being coupled to a second shaft, and fan means for causing cooling air to flow into the device axially from the two ends thereof and issue radially therefrom at a position intermediate said ends, said inner and outer rotors being cylindrical members having end portions which define a plurality of axially-extending openings and circumferential portions which define radially-extending openings, said openings together constituting at least part of a flow path for said air, said fan means being secured to said outer rotor and extending into the radially-extending opening in said stator, said inner rotor comprising a radially extending deflector vane intermediate the said end portions thereof and aligned with said openings whereby said air is deflected from its axial flow path to its radial flow path.

10. A device according to claim 9, wherein part of said cooling air flows axially between said inner and outer rotors and between said outer rotor and said stator to said position intermediate the ends of said device.

References Cited by the Examiner
UNITED STATES PATENTS

| | | | |
|---|---|---|---|
| 1,301,844 | 4/1919 | Hellmund | 310—59 |
| 2,827,581 | 3/1958 | Hayes | 310—105 |
| 3,103,605 | 9/1963 | Russell | 310—105 |

FOREIGN PATENTS 1,132,712  11/1956  France.

MILTON O. HIRSHFIELD, *Primary Examiner.*

DAVID X. SLINEY, *Examiner.*